(12) United States Patent
Olmstead et al.

(10) Patent No.: US 10,974,907 B2
(45) Date of Patent: Apr. 13, 2021

(54) HORIZONTAL MOTION CONVEYORS AND METHODS FOR REVERSING SUCH CONVEYORS

(71) Applicant: Precision, Inc., Pella, IA (US)

(72) Inventors: Rocky Olmstead, Whittemore, IA (US); William Robert Casey, III, San Antonio, TX (US)

(73) Assignee: Precision, Inc., Pella, IA (US)

( * ) Notice: Subject to any disclaimer, the term of this patent is extended or adjusted under 35 U.S.C. 154(b) by 13 days.

(21) Appl. No.: 16/565,799

(22) Filed: Sep. 10, 2019

(65) Prior Publication Data

US 2020/0115165 A1    Apr. 16, 2020

Related U.S. Application Data

(60) Provisional application No. 62/744,375, filed on Oct. 11, 2018.

(51) Int. Cl.
*B65G 25/12* (2006.01)
*B65G 27/32* (2006.01)
*B65G 27/12* (2006.01)

(52) U.S. Cl.
CPC .................. *B65G 27/12* (2013.01)

(58) Field of Classification Search
CPC ................. B65G 27/12; B65G 27/32
USPC ........................ 198/750.1, 750.8, 752.1, 753
See application file for complete search history.

(56) References Cited

U.S. PATENT DOCUMENTS

| | | | |
|---|---|---|---|
| 5,351,807 A | 10/1994 | Svejkovsky et al. | |
| 5,409,101 A * | 4/1995 | Ahmed | B65G 27/32 198/750.1 |
| 5,794,757 A | 8/1998 | Svejkovsky et al. | |
| 5,979,640 A * | 11/1999 | Horton | B65G 27/32 198/752.1 |
| 6,189,683 B1 | 2/2001 | Svejkovsky et al. | |
| 6,357,579 B1 * | 3/2002 | Patterson | B65G 27/24 198/760 |
| 6,415,911 B1 | 7/2002 | Svejkovksy et al. | |
| 6,464,070 B1 * | 10/2002 | Morinaka | B65G 27/32 198/751 |
| 6,991,091 B2 * | 1/2006 | Thomson | B65G 27/20 198/752.1 |
| 7,387,198 B2 * | 6/2008 | Thomson | B65G 27/20 198/760 |
| 7,650,986 B2 * | 1/2010 | Kwasniewicz | B65G 27/32 198/750.8 |
| 7,975,835 B2 * | 7/2011 | Pax | B65G 27/12 198/750.1 |
| 8,066,114 B2 | 11/2011 | Svejkovsky et al. | |
| 8,561,788 B2 * | 10/2013 | Knodell, Jr. | B65G 27/30 198/750.2 |
| 8,752,695 B2 * | 6/2014 | Kwasniewicz | B65G 27/12 198/750.1 |
| 9,027,744 B1 | 5/2015 | Balcar | |

(Continued)

*Primary Examiner* — Douglas A Hess
(74) *Attorney, Agent, or Firm* — Armstrong Teasdale LLP

(57) ABSTRACT

Horizontal motion conveyors for moving material and methods for reversing such horizontal motion conveyors are disclosed. In some embodiments, the horizontal motion conveyor includes a motor such as a servomotor that is connected to the driveshaft that drives the horizontal motion of the conveyor. In some embodiments, the speed profile of the pan may be changed to reverse direction of the flow of material on the pan without slowing or stopping the drive motor.

20 Claims, 16 Drawing Sheets

(56) References Cited

U.S. PATENT DOCUMENTS

| | | | |
|---|---|---|---|
| 9,126,765 B2 * | 9/2015 | Groenewald | B65G 27/28 |
| 9,452,890 B2 * | 9/2016 | Spaulding | B65G 27/24 |
| 9,776,805 B2 * | 10/2017 | Groenewald | B65G 27/32 |
| D866,908 S | 11/2019 | Friesen | |
| 2004/0251115 A1 | 12/2004 | Spoeler | |
| 2005/0081480 A1 | 4/2005 | Gerke | |
| 2008/0041494 A1 | 2/2008 | Paavola | |
| 2009/0000923 A1 | 1/2009 | Jager | |
| 2009/0250322 A1 | 10/2009 | Jager | |
| 2010/0213032 A1 | 8/2010 | Bugge | |
| 2017/0001804 A1 | 1/2017 | Bettati | |
| 2017/0088031 A1 | 3/2017 | Baker et al. | |
| 2020/0039752 A1 | 2/2020 | Massey, Jr. | |
| 2020/0339358 A1 * | 10/2020 | Olmstead | |

\* cited by examiner

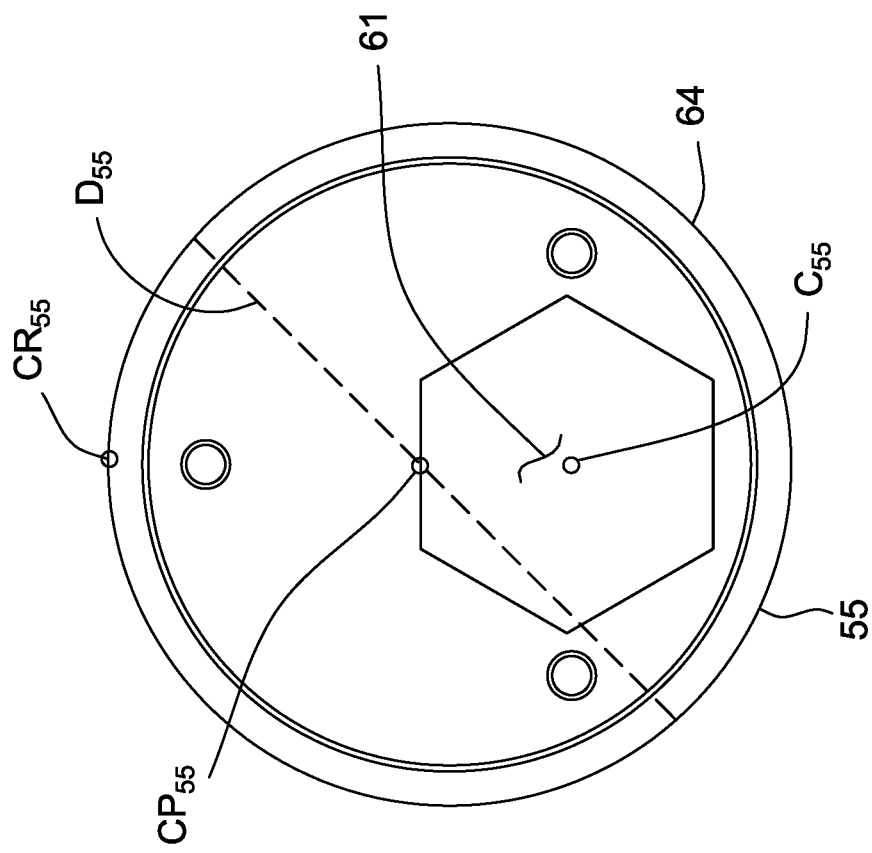
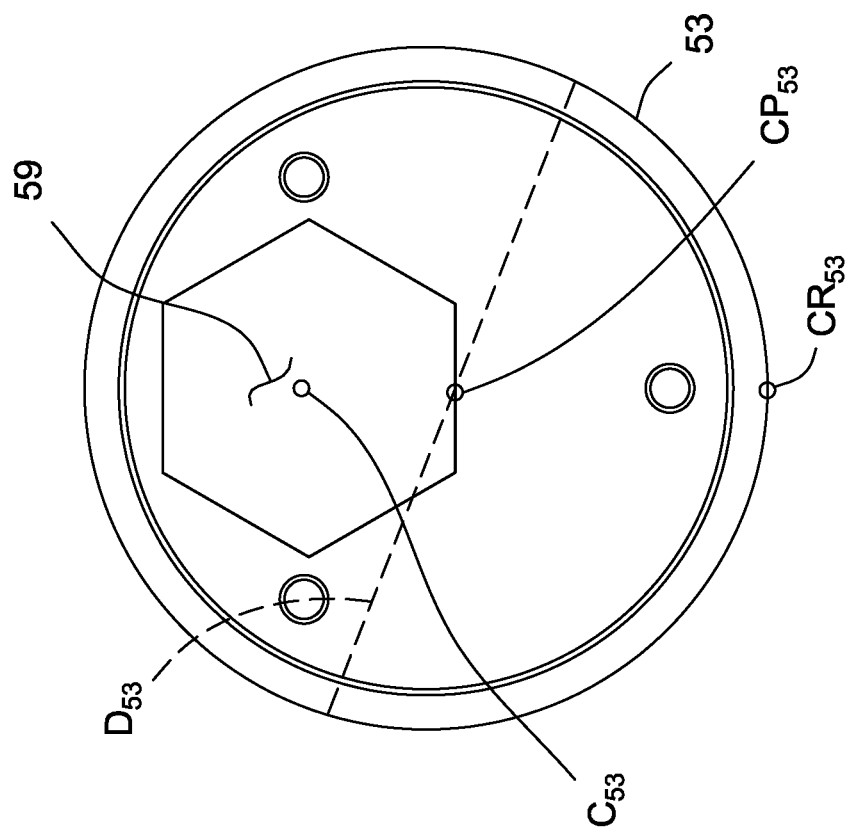
FIG. 7B
FIG. 7A

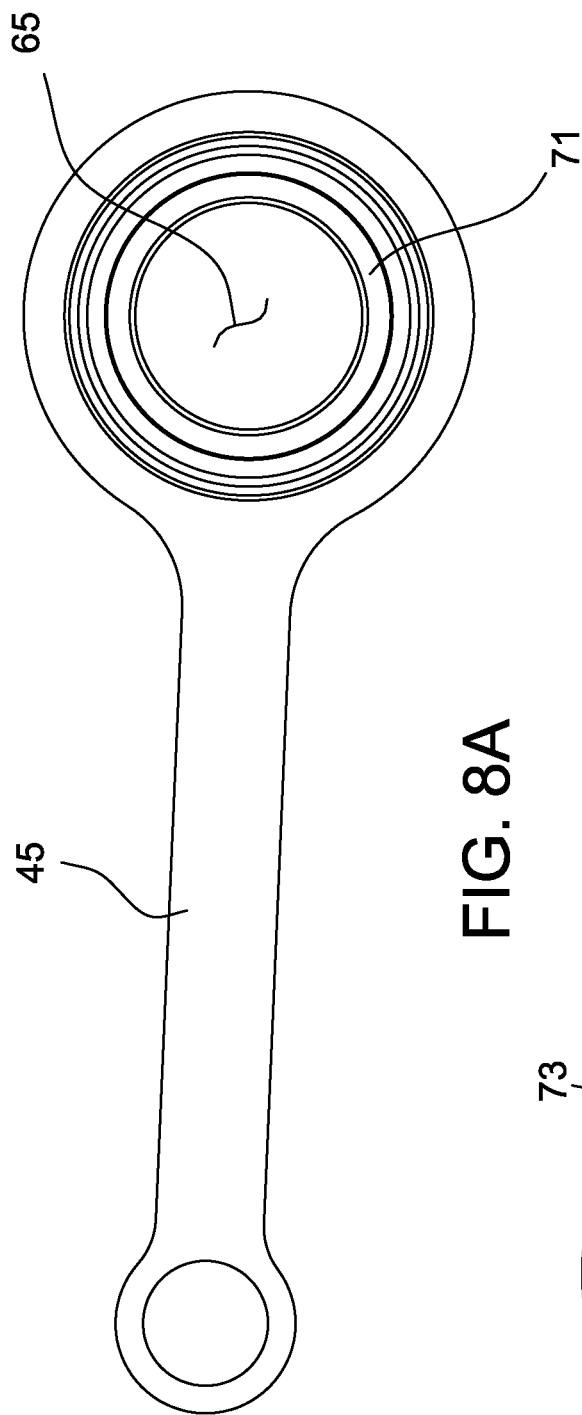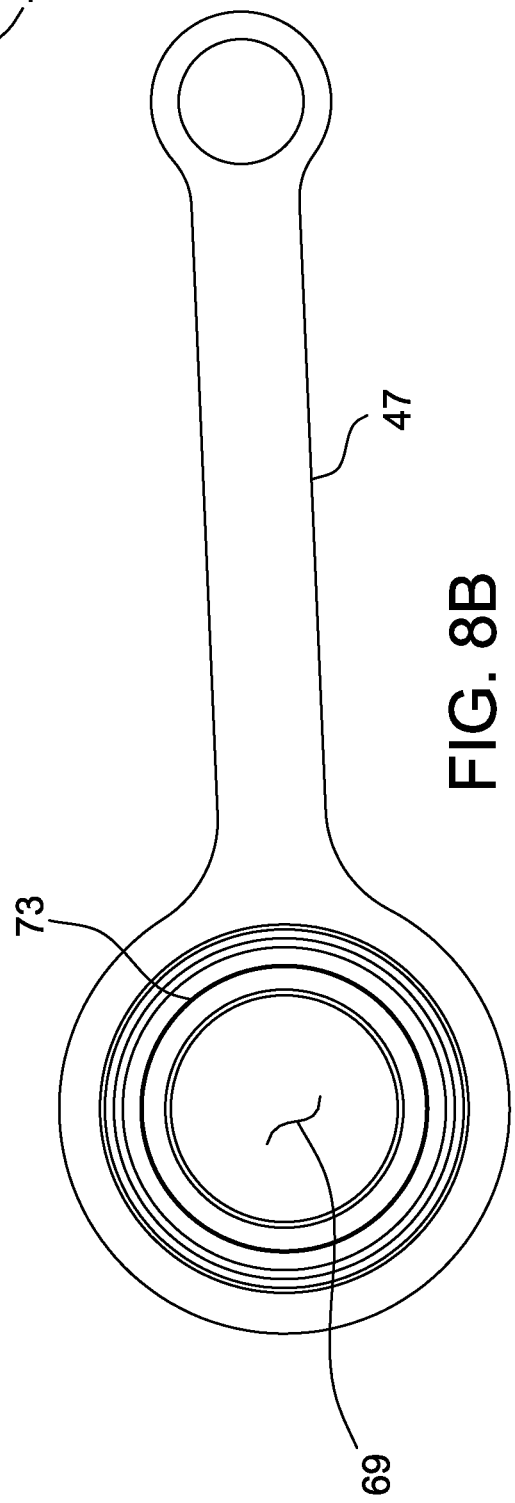
FIG. 8A
FIG. 8B

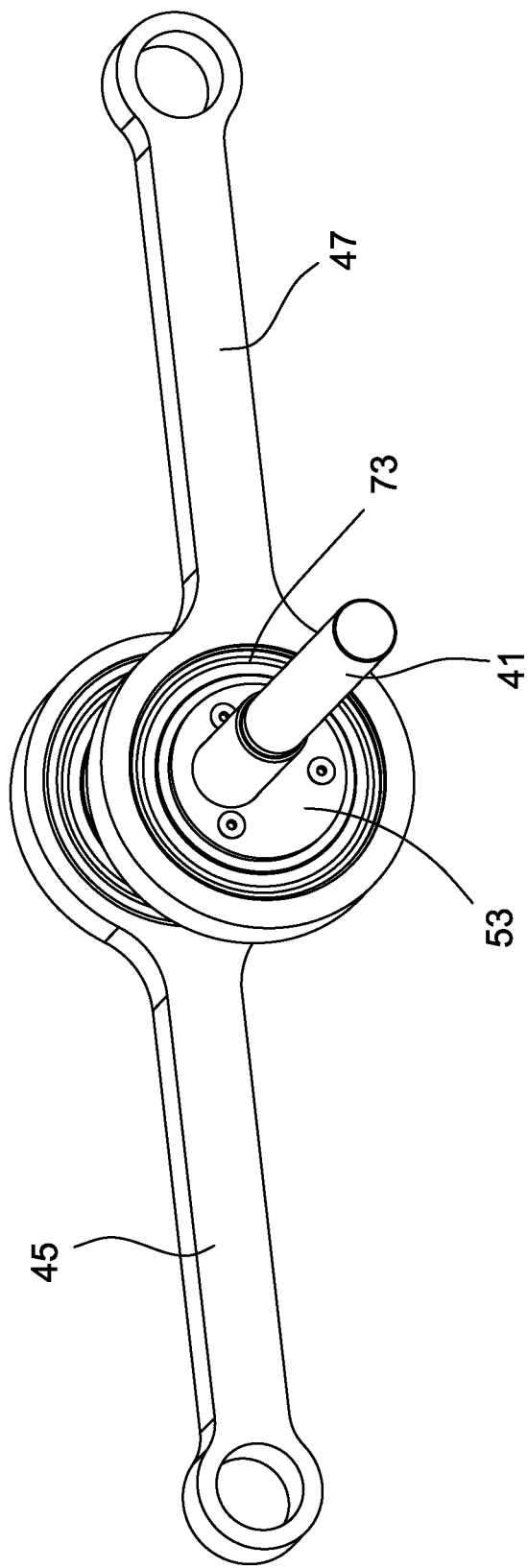

HORIZONTAL MOTION CONVEYORS AND METHODS FOR REVERSING SUCH CONVEYORS

CROSS-REFERENCE TO RELATED APPLICATION

This application claims the benefit of U.S. Provisional Application No. 62/744,375, filed Oct. 11, 2018, which is incorporated herein by reference in its entirety.

FIELD OF THE DISCLOSURE

The field of the disclosure relates to horizontal motion conveyors for moving material and to methods for reversing such horizontal motion conveyors.

BACKGROUND

Horizontal motion conveyors operate by oscillating the pan over which material is carried forward and back relatively quickly. The speeds at which the conveyor moves forward and back changes over the cycle of the pan to allow the bulk material to slide along the conveyor. For example, the conveyor forward acceleration may be less than the rearward acceleration. This causes the inertia of the material to exceed the friction force which causes the material to slide forward. This allows bulk material to be conveyed with little or no bouncing which reduces the vertical impact of the bulk material during conveying. This causes less breakage of the bulk material relative to other conveyor systems such as vibratory conveyors.

In some applications, it is desired to allow the horizontal motion conveyor to reverse direction. This allows the direction in which material flows to be controlled for sorting or to vary the downstream processing of the material. For example, product flow may be reversed to accumulate material evenly on the pan or to reject unwanted product before downstream processing (e.g., as a result of foreign contamination or out of specification product at start-up). Reversing product flow also enables product to be directed to one of two downstream processing operations or to allow product to be split between such processing operations. Conventionally, horizontal motion conveyors change the direction of the flow of material by stopping and reversing the drive motor or by altering one or more components of the drive assembly used to move the conveyor pan forward and back. Stopping and restarting the conveyor results in unnecessary downtime, reduces the lifetime of components, and is less efficient (e.g., uses more energy).

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a horizontal motion conveyor for moving material. The conveyor includes a pan having a floor for carrying material. A driveshaft enables the pan to oscillate forward and back causing material to move toward an end of the pan. The conveyor includes a drive motor connected to the driveshaft for rotating the driveshaft. The conveyor also includes a controller for controlling the rate of rotation of the driveshaft. The controller is configured to change the direction that material moves over the pan by changing a speed profile of the pan.

Another aspect of the present disclosure is directed to a method for reversing a horizontal motion conveyor having a pan that carries and moves material toward a first end or a second end of the pan. Material is loaded on the pan. Material is conveyed toward the first end of the pan while oscillating the pan forward and back. The pan accelerates and decelerates as it moves forward and back according to a first speed profile that causes material to move toward the first end of the pan. Material is conveyed toward the second end of the pan while oscillating the pan forward and back. The pan accelerates and decelerates as it moves forward and back according to a second speed profile that causes material to move toward the second end of the pan.

A further aspect of the present disclosure is directed to a horizontal motion conveyor for moving material. The conveyor includes a pan having a floor for carrying material and includes a counterweight assembly having a counterweight top structure disposed below the pan. A driveshaft enables the pan to oscillate forward and back causing material to move toward an end of the pan and that enables the counterweight top structure to oscillate forward and back. The conveyor includes a first crank arm that moves forward and back upon rotation of the driveshaft. A counterweight drive frame is connected to the first crank arm and the counterweight top structure. The first crank arm pivots the counterweight drive frame to move the counterweight top structure. A second crank arm moves forward and back upon rotation of the driveshaft. The conveyor includes a pan drive frame connected to the second crank arm and the pan. The second crank arm pivots the pan drive frame to move the pan. The conveyor includes a drive motor for rotating the driveshaft.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 7A is a side view of a first cam of the camshaft;

FIG. 7B is a side view of a second cam of the camshaft;

FIG. 8A is a side view of a first crank arm of the horizontal motion conveyor;

FIG. 8B is a side view of a second crank arm of the horizontal motion conveyor;

FIG. 9 is a perspective view of the crankshaft and the first and second crank arms;

Corresponding reference characters indicate corresponding parts throughout the drawings.

DETAILED DESCRIPTION

Figure 1:
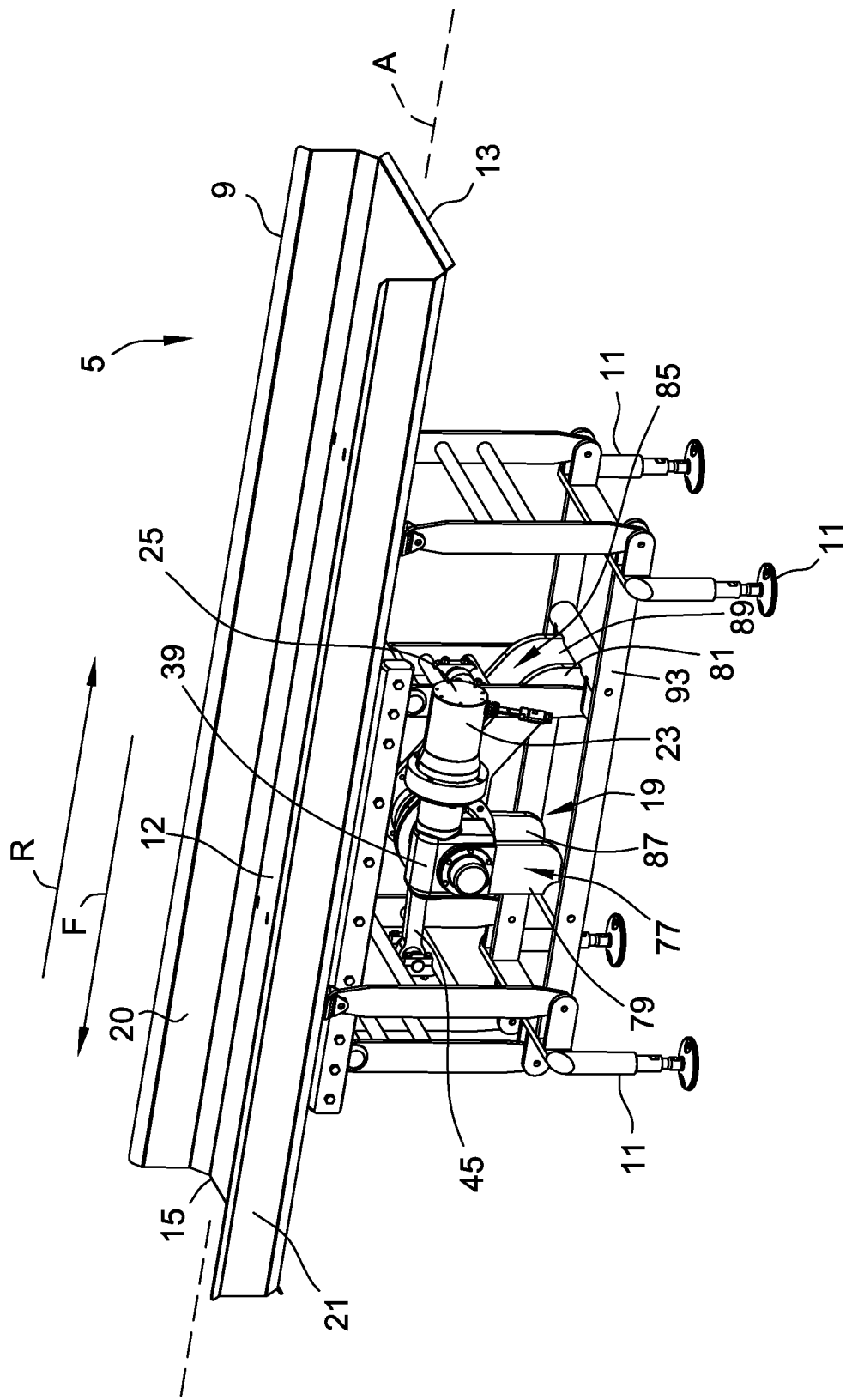
FIG. 1 is a perspective view of a horizontal motion conveyor.
Figure 2:
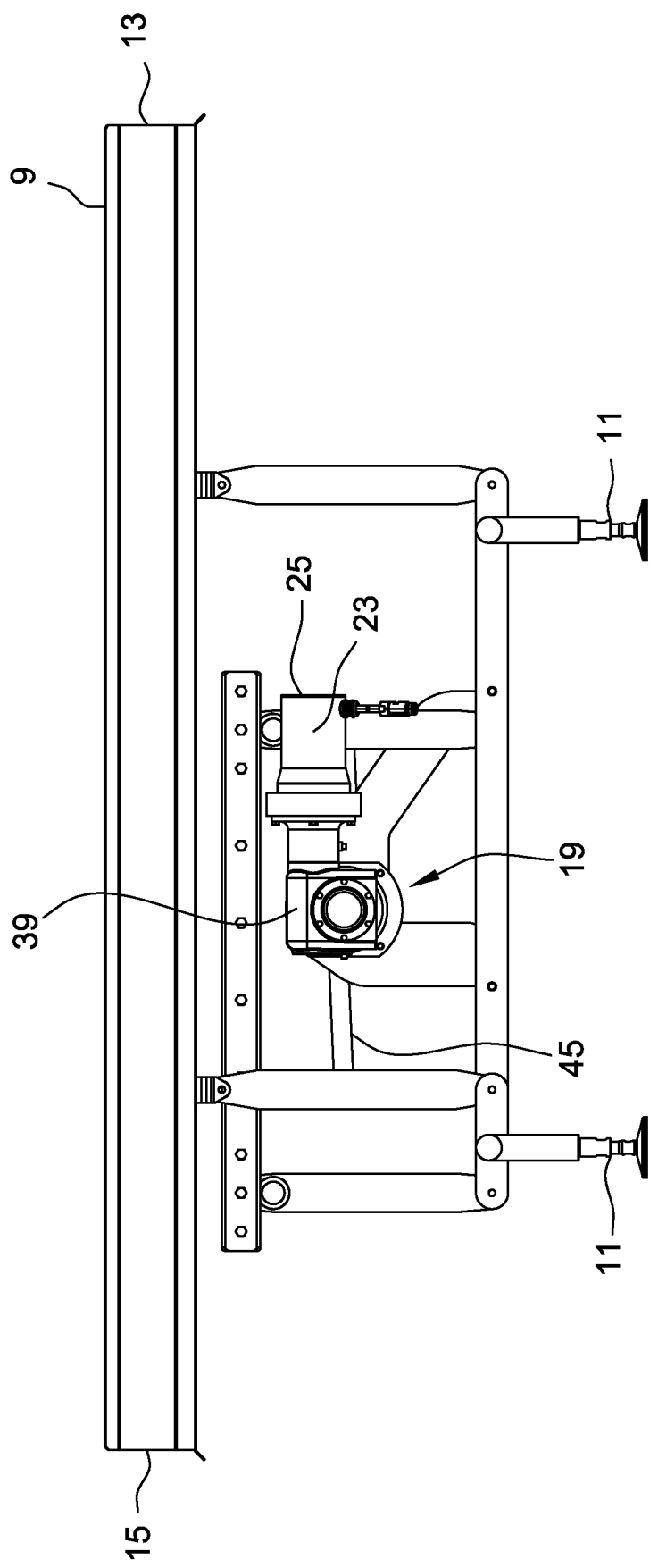
FIG. 2 is a side view of the horizontal motion conveyor.
Figure 3:
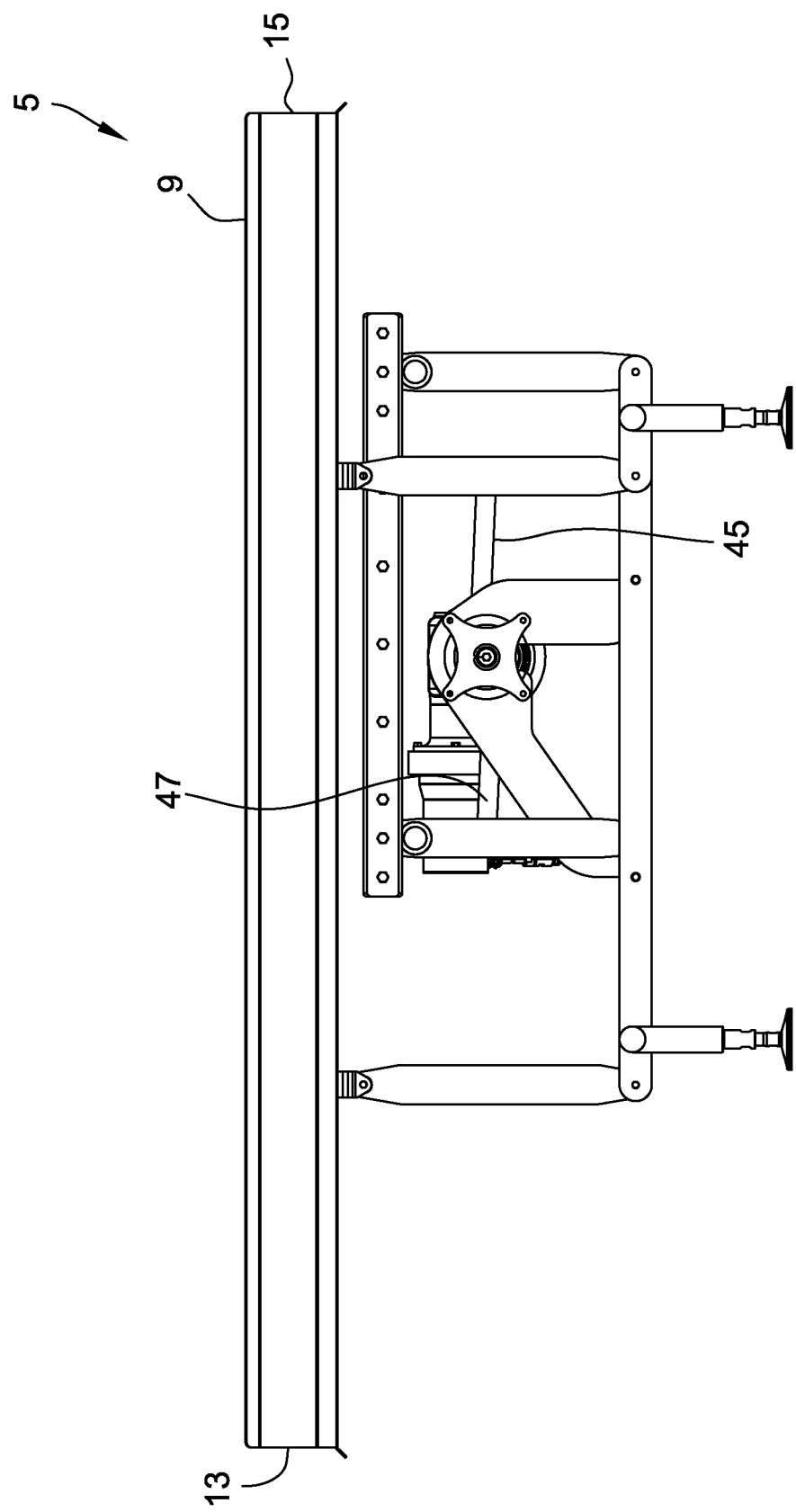
FIG. 3 is another side view of the horizontal motion conveyor.

An example horizontal motion conveyor 5 of the present disclosure is shown in FIG. 1. The conveyor 5 is supported by feet 11. In other embodiments, the conveyor 5 is wheeled or suspended from another structure. The conveyor 5 may be connected to other conveyors. The horizontal motion conveyor 5 includes a tray or pan 9 upon which material is transported. The pan 9 includes a first end 13 and a second end 15 and includes a contact surface or floor 12 over which material is carried. The pan 9 includes two sides 20, 21 which extend upward from the floor 12. In some embodiments and as further explained below, the horizontal motion conveyor 5 is configured to move material toward the first end 13 or the second end 15 of the pan 9 (i.e., the flow of material on the pan 9 is reversible). The pan 9 may be made of any material suitable to carry the material which is conveyed by the pan 9. In some embodiments, the pan 9 is made of aluminum, stainless steel or composite plastic. The pan 9 may be horizontal as shown or may be inclined downward or even upward.

Material moves on the pan 9 by use of horizontal motion (which may also be referred to as "linear" motion) that is generated by a drive assembly 19. The drive assembly 19 oscillates the pan 9 forward and back to cause material to slide along the pan 9 either in direction F or direction R. Generally, the horizontal motion conveyor 5 should be distinguished from vibratory conveyors that cause material to bounce along the pan. Such vibratory conveyors may generate vibration by electromagnets or the like. The illustrated horizontal motion conveyor 5 is a direct drive conveyor and, generally, should be distinguished from inertia drive conveyors.

Figure 4:
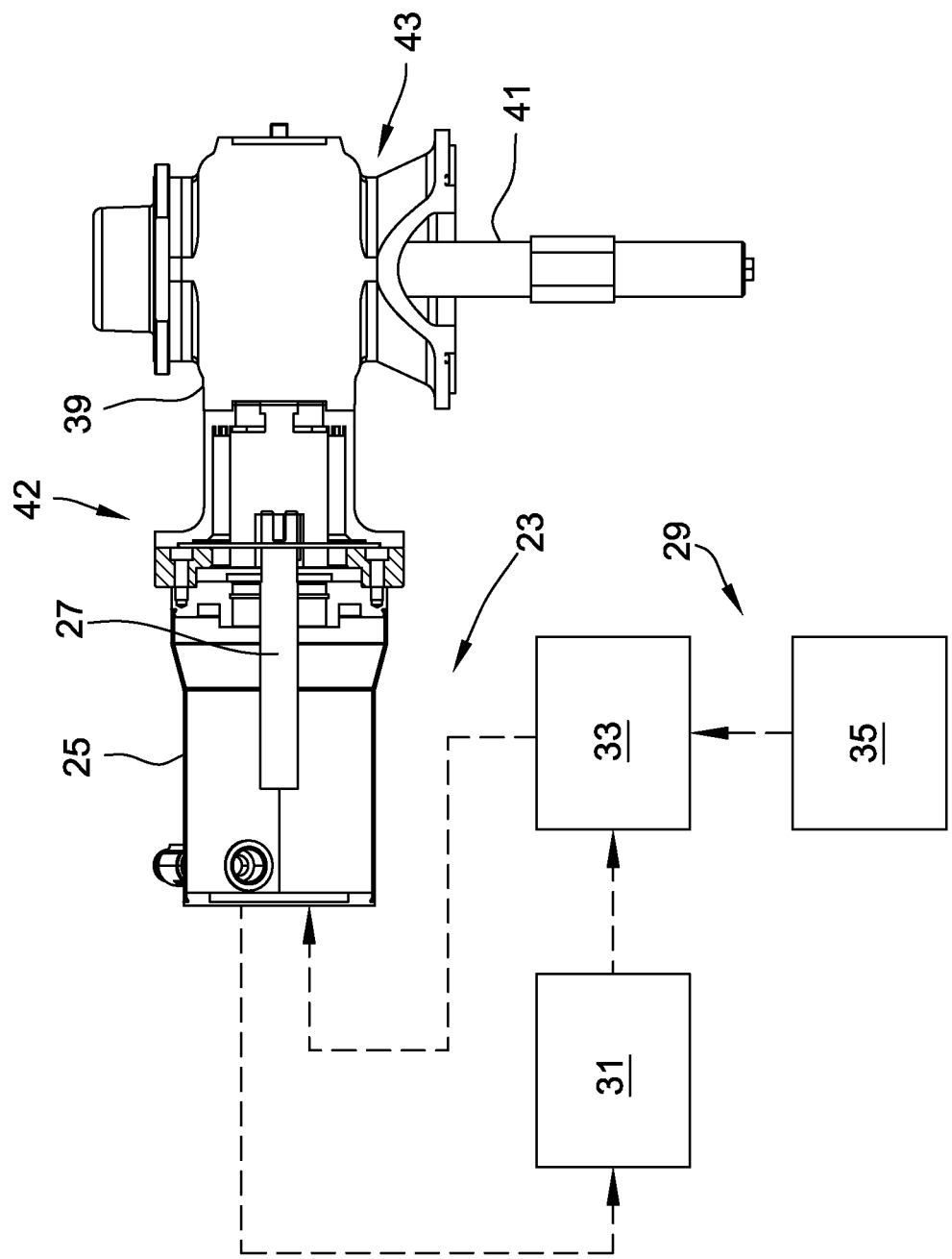
FIG. 4 is a cross-section top view of the drive motor, gearbox and drive shaft of the horizontal motion conveyor with a control system that controls rotation of the drive motor shaft being shown schematically.

The drive assembly 19 includes a drive motor which, in the illustrated embodiment, is a rotary servomotor 23. Referring now to FIG. 4, the servomotor 23 includes a motor 25 that rotates a servomotor shaft 27. The servomotor 23 also includes a control system 29 to control the rotation and angular position of the shaft 27 as further described below. An example control system 29 includes a sensor 31 that determines the angular position of the servomotor shaft 27. The sensor 31 is communicatively connected to a controller 33 that controls the rotation and positioning of the shaft 27.

The controller 33 is communicatively connected to the servomotor 23. In some embodiments, the controller 33 controls the speed of the motor 25 such as through a variable speed drive (e.g., as with a programmed logic controller (PLC) that controls speed (e.g., cycles/min) to change product speed).

The servomotor 23 is connected to a gearbox 39 to translate the movement of the servomotor shaft 27 to the conveyor driveshaft 41. The gearbox 39 may also increase the torque transferred from the servomotor 23. In the illustrated embodiment, the servomotor shaft 27 and driveshaft 41 are perpendicular to each other and the gearbox 39 changes the direction of the driveline (i.e., the gearbox 39 is a right angle gearbox). In other embodiments, the servomotor shaft 27 and driveshaft 41 are aligned.

Figure 6:
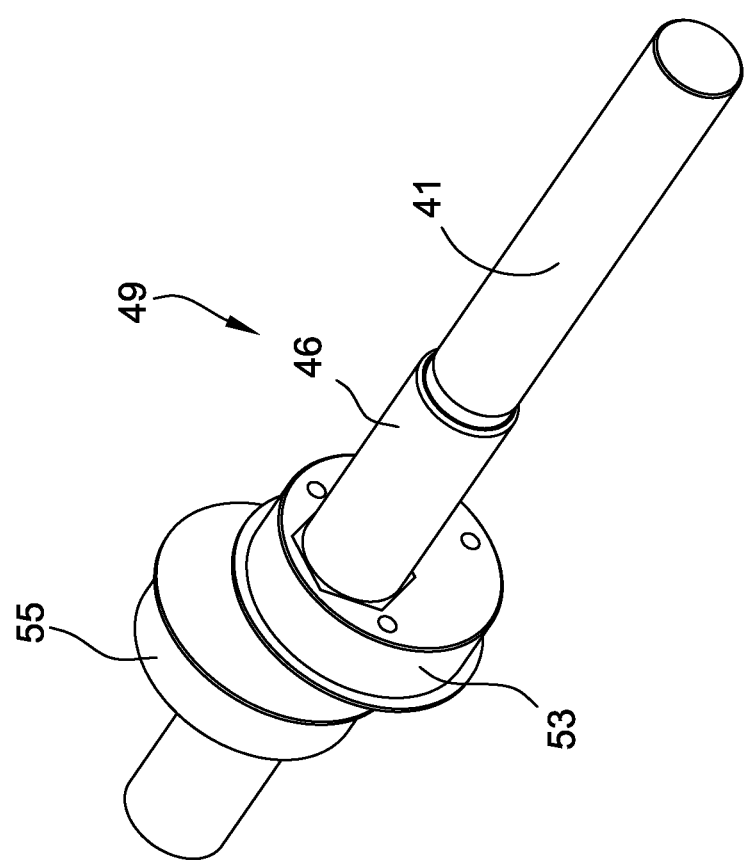
FIG. 6 is a perspective view of a camshaft of the horizontal motion conveyor.
Figure 16:
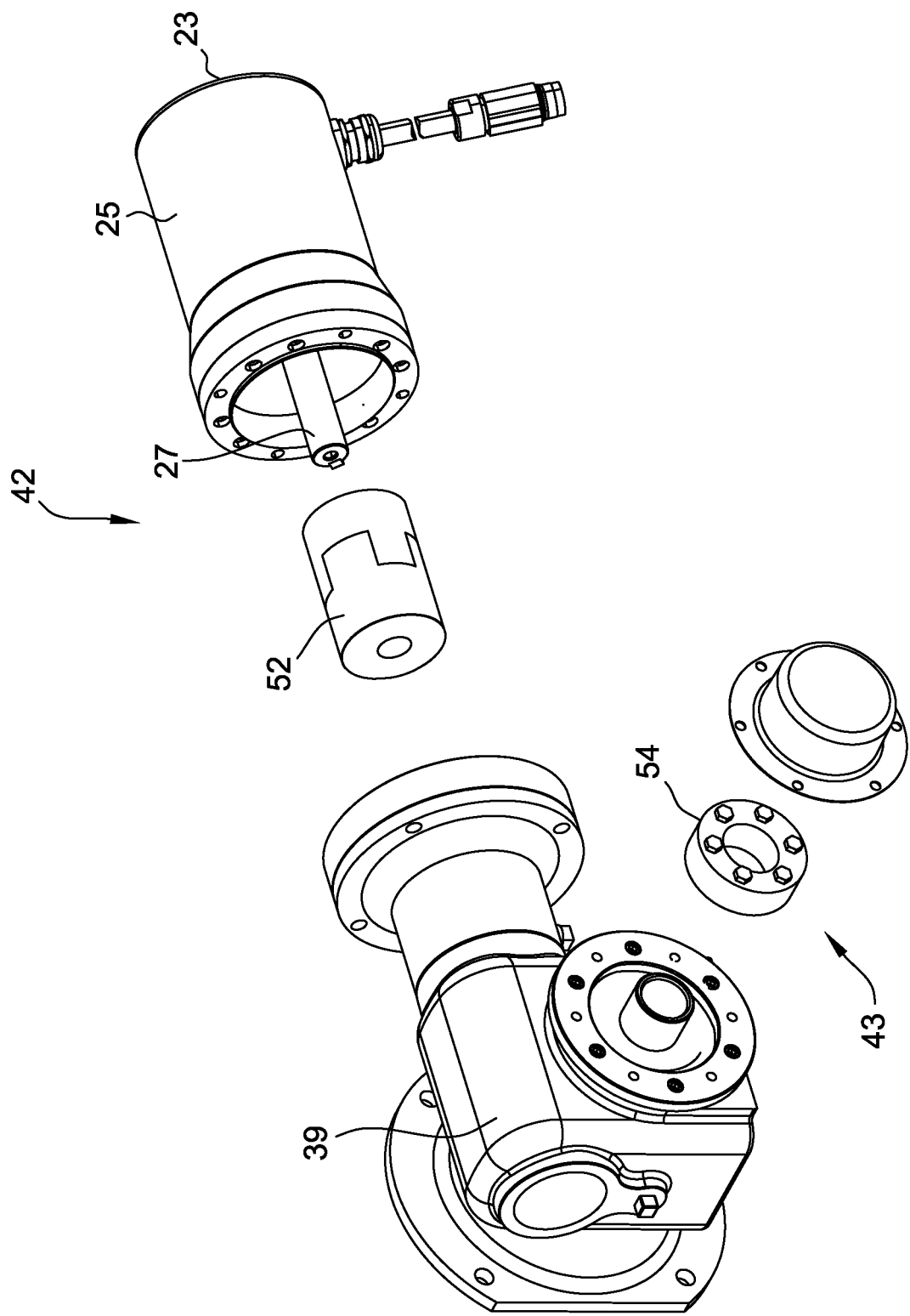
FIG. 16 is an exploded view of keyless lock couplings between the servomotor, gearbox, and drive shaft.

In some embodiments, the gearbox 39 includes a worm drive in which a worm screw connected to the servomotor shaft 27 turns a worm gear or wheel connected to the conveyor driveshaft 41. In some embodiments, the gearbox has little or zero backlash (e.g., includes gears that are shimmed to remove the backlash). The gearbox 39 may be connected to the driveshaft 41 by an interference fit 46 (FIG. 6) to reduce or eliminate slippage and backlash. The gearbox 39 may connect to the servomotor shaft 27 and/or to the driveshaft 41 by a keyless lock coupling 42, 43 (FIG. 16). Such keyless lock couplings 42, 43 use a friction fit between the shaft 27, 41 and the gearbox 39 and do not include a key or keyway. For example, the coupling 42, 43 may include clamping collars 52, 54 that draw down on the shafts 27, 41 to allow the keys to be eliminated. In the embodiment illustrated in FIG. 16, the first clamping collar 52 is a gam keyless clamping shaft coupling that connects the servomotor shaft 27 to the male input shaft of the gearbox 39. The second clamping collar 54 is a shrink disk that enables a keyless and reduced or zero backlash connection with the driveshaft 41 (FIG. 6).

In the illustrated embodiment, the servomotor 23 is directly connected to the driveshaft 41 through the gearbox 39 (e.g., the drive assembly 19 does not include cables, chains, or belts that are used to translate rotation of the motor shaft 27 to the drive shaft 41). Stated otherwise, in some embodiments, the driveline from the motor 25 to the driveshaft 41 only includes rotating shafts or gears.

Figure 5:
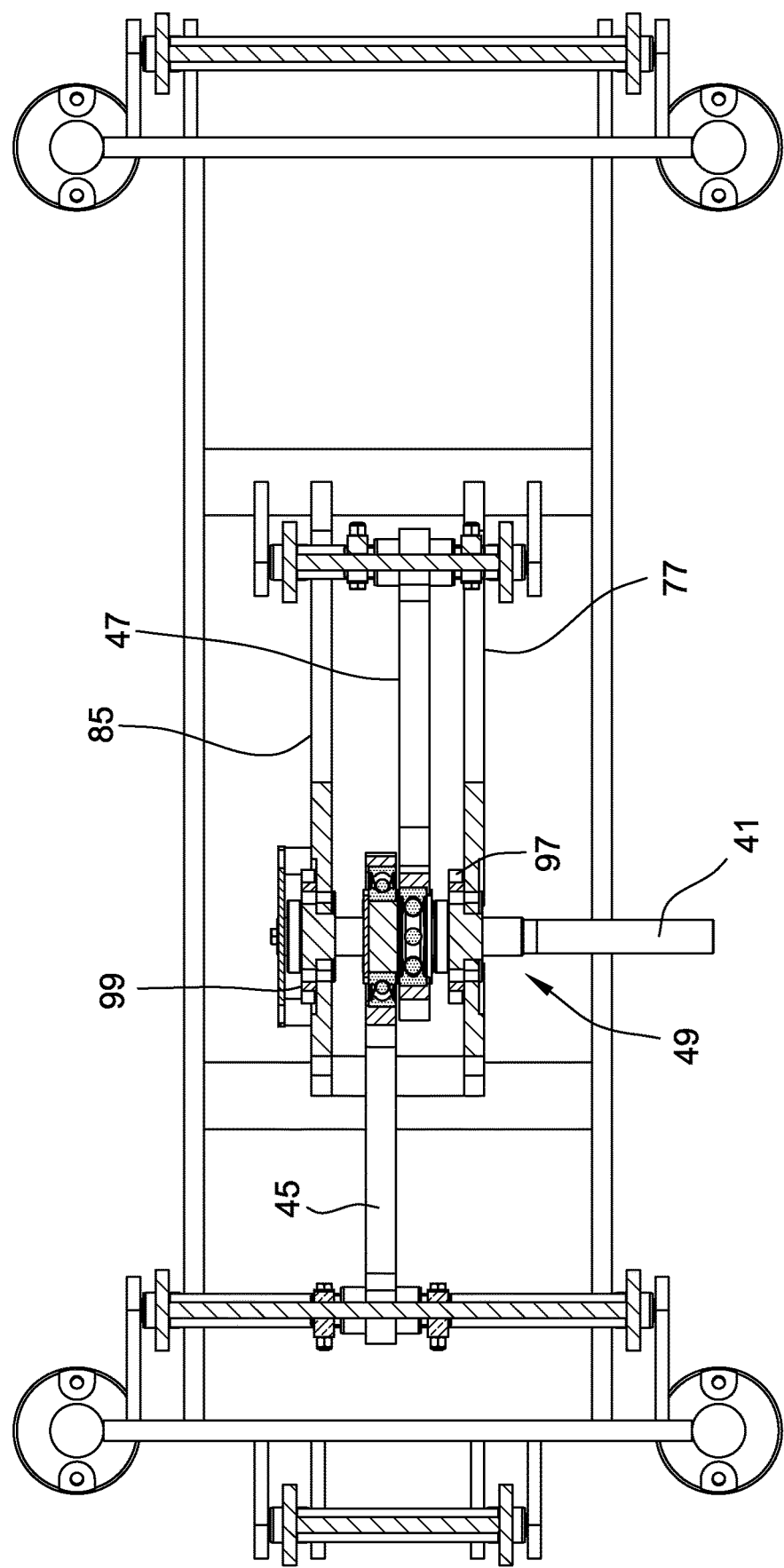
FIG. 5 is a cross-section top view of the horizontal motion conveyor.

In some embodiments, the drive assembly 19 is based on eccentric drive principles. Referring now to FIG. 5 in which the pan is not shown for illustration, the conveyor driveshaft 41 is connected to a first crank arm 45 and second crank arm 47. In the illustrated embodiment, the driveshaft 41 is part of a camshaft 49 and each crank arm 45, 47 moves back and forth relative to the longitudinal axis A (FIG. 1) as the camshaft 41 rotates. As shown in FIG. 6, the camshaft 49 includes a first cam 53 and a second cam 55 that are both connected to the driveshaft 41. In the illustrated embodiment, the first and second cams 53, 55 are eccentric cams. That is, each cam 53, 55 includes a cam through-hole 59, 61 (FIGS. 7A, 7B) defining an axis of rotation $C_{53}$, $C_{55}$ of the cam 53, 55 that is offset from the physical center point $CP_{53}$, $CP_{55}$ (i.e., center point along the diameter $D_{53}$, $D_{55}$) of the cam 53, 55. Each cam 53, 55 includes a crown $CR_{53}$, $CR_{55}$ which is the point on the outer surface 63, 64 of the cam 53, 55 at which the distance from the axis of rotation $C_{53}$, $C_{55}$ to the outer surface 63, 64 is the greatest.

The cam through-holes 59, 61 are hex-shaped and connect to a hex portion of the driveshaft 41. The cams 53, 55 may connect to the hex portion of the driveshaft 41 in an interference fit.

As shown in FIG. 7A, the first and second cams 53, 55 are offset from each other. That is, the crown $CR_{53}$ of the first cam 53 is angularly offset from the crown $CR_{55}$ of the second cam 55. In the illustrated embodiment, the cams 53, 55 are offset about 180° from each other. In other embodiments, the cams 53, 55 are offset less than 180°. The offset of the cams 53, 55 allows the crank arms 45, 47 to move in opposite directions (e.g., one crank arm being extended while the other is retracted and vice-versa).

Figure 10:
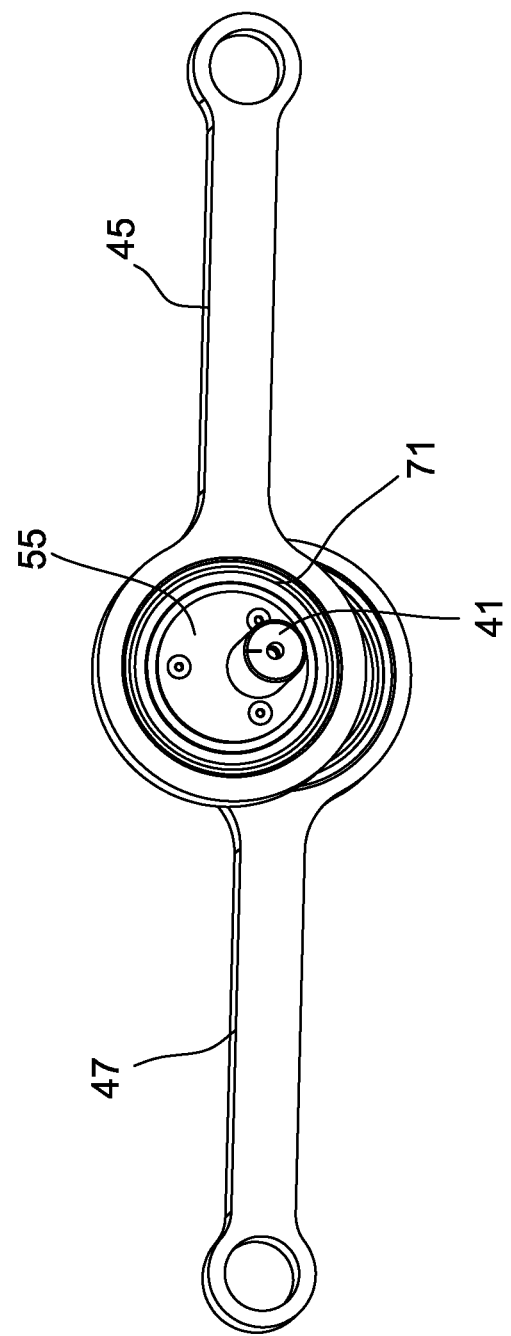
FIG. 10 is another perspective view of the crankshaft and the first and second crank arms.

The first cam 53 is received in a first crank arm through-hole 65 (FIG. 8A) and the second cam 55 is received in a second crank arm through-hole 69 (FIG. 8B). Each crank arm 45, 47 includes a bearing 71, 73 to facilitate rotation of the cam 53, 55 within each crank arm 45, 47 (FIGS. 9 and 10). The camshaft 49 rotates to cause the crank arms 45, 47 to move back and forth.

The drive assembly 19 is supported by first and second support members 77, 85 (FIG. 1) that are connected to the conveyor frame 93. The first support member 77 includes first and second support arms 79, 81 connected to the frame 93. The second support member 85 includes first and second support member arms 87, 89 connected to the frame 93. The driveshaft 41 (FIG. 5) is connected to the first and second support members 77, 85 by hubs 97, 99, respectively.

Figure 11:
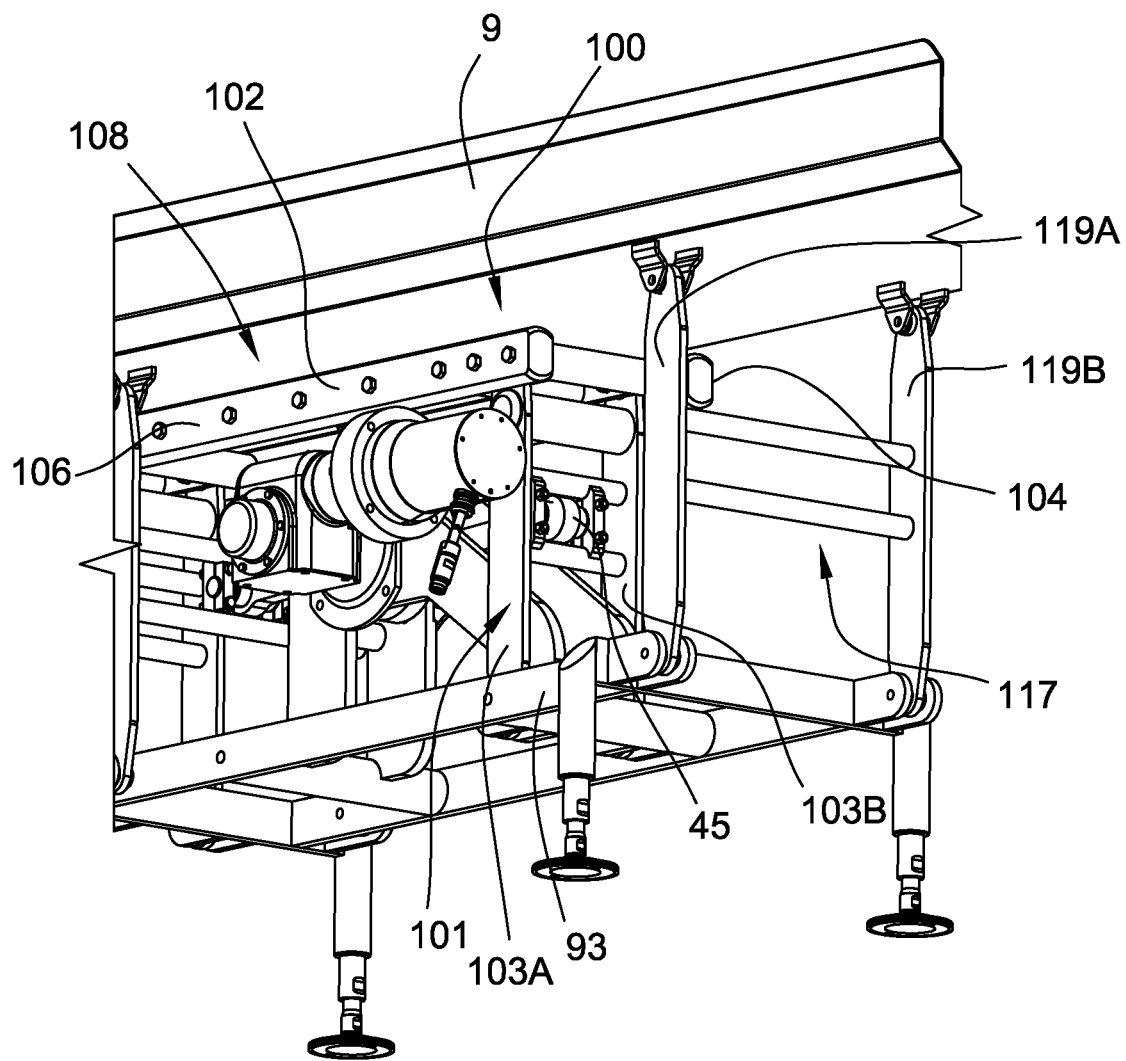
FIG. 11 is a detailed perspective view of the horizontal motion conveyor.
Figure 12:
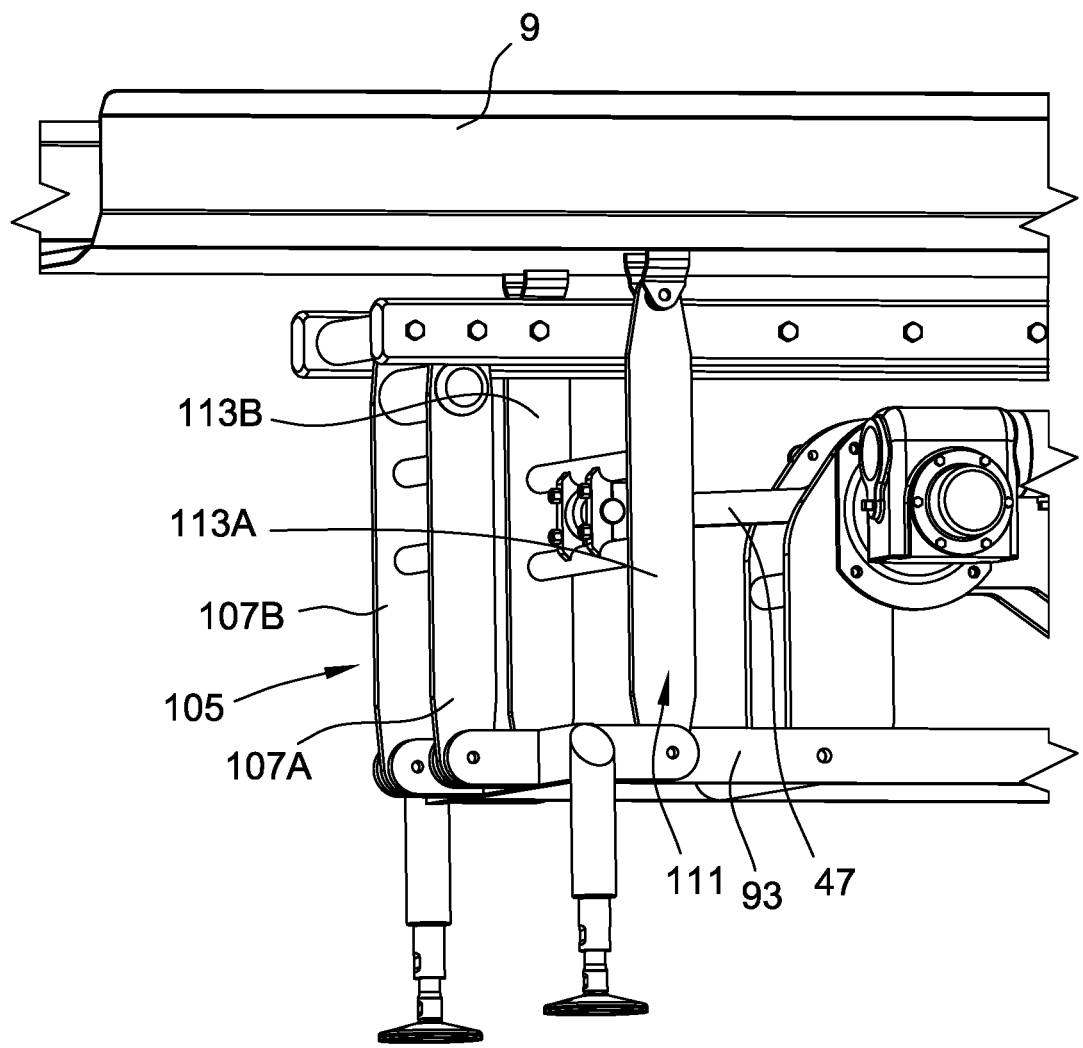
FIG. 12 is another detailed perspective view of the horizontal motion conveyor.

Referring now to FIG. 11, the horizontal motion conveyor 5 includes a counterweight assembly 100 to reduce vibration of the conveyor 5. The counterweight assembly 100 includes a counterweight top structure 102 that moves back and forth relative to the longitudinal axis A (FIG. 1) as the camshaft 49 (FIG. 6) rotates. The counterweight top structure 102 includes first and second rails 104, 106 and weight members 108 (e.g., rods) that extend between the rails 104, 106. In some embodiments, the weight members 108 are interchangeable on the top structure 102 to allow the weight of the counterweight assembly 100 to be changed. The counterweight top structure 102 is supported by a counterweight drive frame 101 and a counterweight idler frame 105 (FIG. 12). The counterweight drive frame 101 (FIG. 11) includes first and second counterweight rocker arms 103A, 103B. The counterweight idler frame 105 (FIG. 12) includes first and second counterweight idler rocker arms 107A, 107B.

The first crank arm 45 is pivotally connected to the counterweight drive frame 101. The counterweight drive frame 101 is pivotally connected to the conveyor frame 93 and the counterweight top structure 102. The counterweight idler frame 105 is also pivotally connected to the conveyor frame 93 and the counterweight top structure 102. As the first crank arm 45 moves back and forth, the counterweight drive frame 101 pivots relative to the conveyor frame 93. This causes the counterweight top structure 102 to move back and forth and causes the counterweight idler frame 105 (FIG. 12) to move back and forth in response.

The counterweight top structure is disposed below the pan 9. The counterweight top structure 102 is disposed above the camshaft 49 and is above the drive motor and gearbox 39.

The pan 9 is supported by a pan drive frame 111 (FIG. 12) and a pan idler frame 117 (FIG. 11). The pan drive frame 111 includes first and second pan rocker arms 113A, 113B. The pan idler frame 117 includes first and second pan idler rocker arms 119A, 119B. The pan drive frame 111 is pivotally connected to the conveyor frame 93 and is pivotally connected to the pan 9. The pan idler frame 117 is also pivotally connected to the frame 93 and to the pan 9.

Referring now to FIG. 12, the second crank arm 47 is pivotally connected to the pan drive frame 111. As the second crank arm 47 moves back and forth relative to the longitudinal axis A (FIG. 1), the pan drive frame 111 pivots relative to the conveyor frame 93. This causes the pan 9 to move back and forth and causes the pan idler frame 117 (FIG. 11) to move back and forth in response.

Material moves along the pan 9 due to changes in acceleration and deceleration of the pan as it cycles forward. For example and with reference to FIG. 13, to move material in direction F (FIG. 1), the pan 9 accelerates forward as it moves forward. At the full extension of the second crank arm 47 (FIG. 12), the pan 9 reverses direction, continues to accelerate and then begins to decelerate. When the pan 9 reverses direction again and moves forward (i.e., towards the end of the curve of FIG. 13), the pan 9 has decelerated. The speed profile of FIG. 13 allows the product to slide or "fling" forward on the pan 9 when the pan changes from forward motion to backward motion with little or no product moving back on the pan 9 when the pan changes from backward motion to forward motion. In this manner, product moves toward the second end 15 of the pan in direction F.

According to embodiments of the present disclosure, the angular velocity of the camshaft 49 (FIG. 6) during a revolution of the camshaft 49 is controlled to change the acceleration and deceleration of the pan 9 during its forward and backward cycle. Referring now to FIG. 4, a controller 33 regulates the speed of the camshaft 49 such as through a variable frequency drive.

Figure 13:
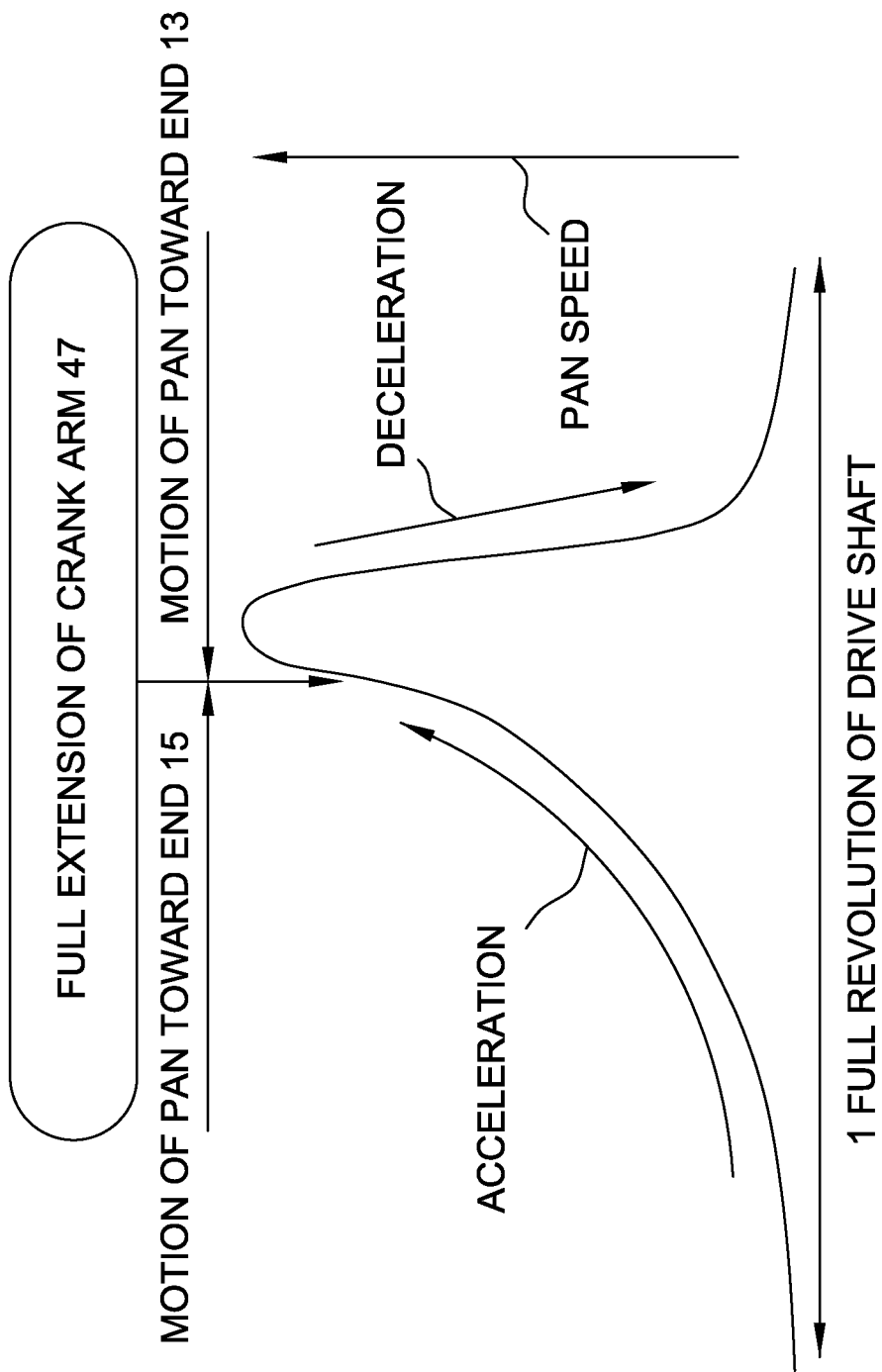
FIG. 13 is a speed profile curve for moving material in a forward direction.
Figure 14:
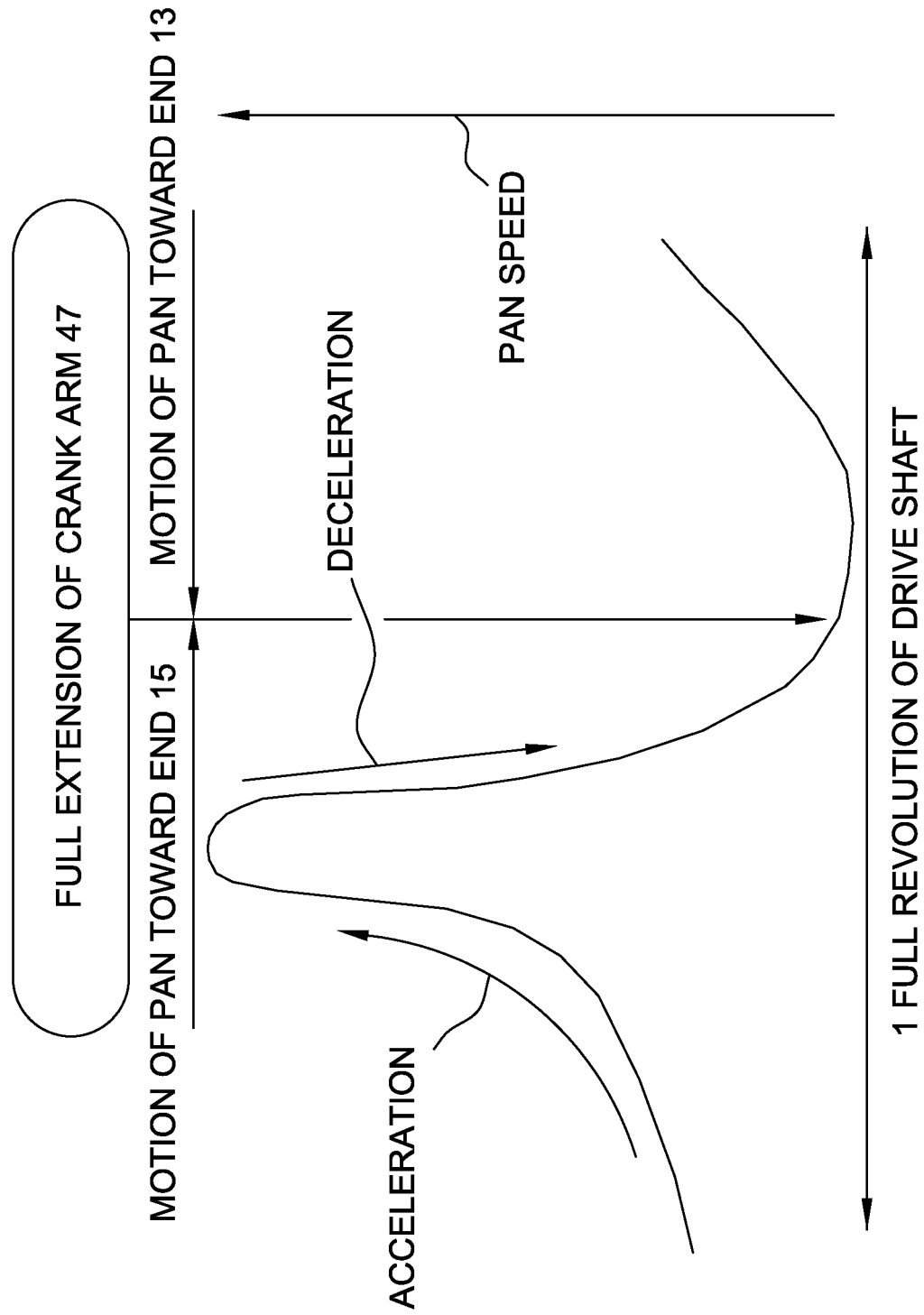
FIG. 14 is a speed profile curve for moving material in a reverse direction.

The controller 33 regulates the speed of the camshaft 49 to achieve an acceleration and deceleration profile such as the speed profile of FIG. 13 or of FIG. 14. In some embodiments, the controller 33 regulates speed of rotation of the servomotor shaft 27 by feedback from the sensor 31 (i.e., in a feedback control loop such as PID control). The speed at which material moves forward (i.e., the oscillation rate at which the pan moves forward and back) may also be regulated by the controller 33 such as through input by a user in a user interface 35.

The controller 33 includes a processor and a memory. The processor processes the signals received from various sensors, selectors and control devices of the system. The memory stores instructions that are executed by the processor.

Controller 33 may be a computer system. Computer systems, as described herein, refer to any known computing device and computer system. As described herein, all such computer systems include a processor and a memory. However, any processor in a computer system referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

The term processor, as used herein, refers to central processing units, microprocessors, microcontrollers, reduced instruction set circuits (RISC), application specific integrated circuits (ASIC), logic circuits, and any other circuit or processor capable of executing the functions described herein. The above are examples only, and are thus not intended to limit in any way the definition and/or meaning of the term "processor."

In one embodiment, a computer program is provided to enable controller 33, and this program is embodied on a computer readable medium. In an example embodiment, the computer system is executed on a single computer system, without requiring a connection to a server computer. In a further embodiment, the computer system is run in a Windows® environment (Windows is a registered trademark of Microsoft Corporation, Redmond, Wash.). In yet another embodiment, the computer system is run on a mainframe environment and a UNIX® server environment (UNIX is a registered trademark of X/Open Company Limited located in Reading, Berkshire, United Kingdom). Alternatively, the computer system is run in any suitable operating system environment. The computer program is flexible and designed to run in various different environments without compromising any major functionality. In some embodiments, the computer system includes multiple components distributed among a plurality of computing devices. One or more components may be in the form of computer-executable instructions embodied in a computer-readable medium.

The computer systems and processes are not limited to the specific embodiments described herein. In addition, components of each computer system and each process can be practiced independent and separate from other components and processes described herein. Each component and process also can be used in combination with other assembly packages and processes.

In accordance with embodiments of the present disclosure, the direction at which material travels on the pan 9 may be reversed by changing the speed profile of the camshaft 49 within a revolution of the camshaft 49. This causes the acceleration and deceleration profile of the pan 9 to change. For example and as shown in FIG. 14, the speed curve has been shifted about 180° from the profile of FIG. 13. This causes the material on the pan 9 to slide toward the first end 13 (FIG. 1) of the pan 9 in direction R. As the pan 9 reverses during the revolution of the camshaft 49 and moves in the direction R, the velocity of the pan 9 is reduced which reduces (or eliminates) the amount of material that slides back toward end 15.

In the embodiment illustrated in FIGS. 13 and 14, the speed curve has shifted 180°. Generally, the speed profile may be altered in any manner that allows material to reverse its direction on the pan 9. The speed profiles of FIGS. 13 and 14 are example speed profiles that are provided for illustration and should not be considered in a limiting sense. Generally any set of two or more speed profiles that allows material to selectively move toward the first end 13 or the second end 15 depending on which direction is selected by an operator may be used unless stated otherwise.

The controller 33 may change the speed profile to reverse the direction of material on the pan 9 by, for example, controlling the speed of rotation of the servomotor shaft 27 during a revolution of the shaft 27. The controller 33 may produce an output signal based on the desired forward/reverse direction. The signal is transmitted to the motor 25 to vary the speed of the servomotor shaft 27.

Figure 15:
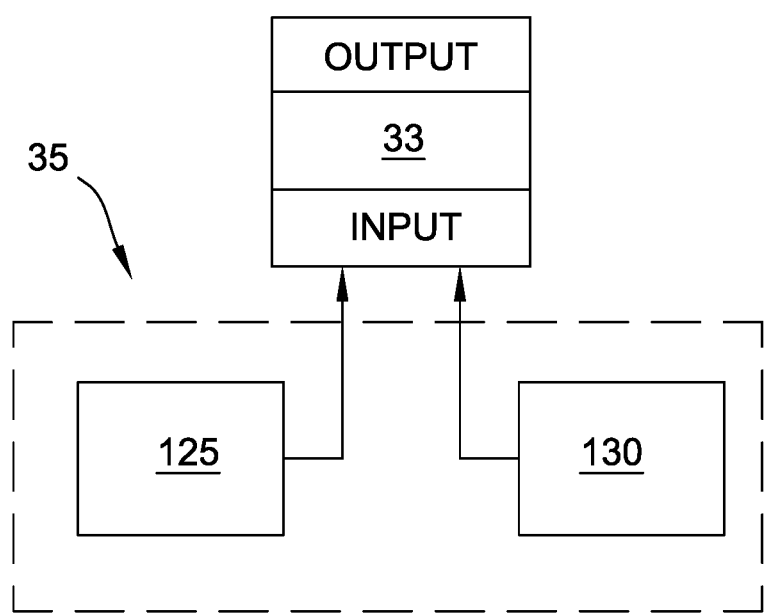
FIG. 15 is a schematic of a controller and user interface of the horizontal motion conveyor.

The controller 33 may adjust the profile based on input from the user interface 35. For example and with reference to FIG. 15, user interface 35 may include a forward-reverse control device 125 (e.g., switch, dial, touch-screen selection, computer input, or the like). The user interface 35 may also include a speed control device 130 that varies the speed at which material moves on the pan 9.

In some embodiments, at least two sets of instructions for varying the output of the servomotor 23 is stored in the controller memory. For example, the controller memory may store a set of instructions for forward direction and a set of instructions for reverse direction. Upon selection of a forward or reverse direction by an operator on the forward-reverse control device 125, the controller 33 produces signals based on the corresponding set of instructions that is associated with the selected direction.

In the illustrated embodiment, the horizontal motion conveyor 5 is able to reverse the direction of material on the pan 9 without reversing direction of the drive assembly 19 (e.g., without change of direction of the servomotor 23 and/or the camshaft 49). The direction of the flow of material on the pan 9 may be reversed by altering the angular velocity of the servomotor 23 during a revolution of the camshaft 49 as described above.

In some embodiments, the conveyor 5 includes multiple drive assemblies 19 with the servomotor 23 of each drive assembly 19 being connected to a common controller 33. This allows relatively longer conveyors 5 to be used.

The horizontal motion conveyors of the present disclosure have several advantages over conventional horizontal motion conveyors. In embodiments in which the drive motor is directly connected to the driveshaft (e.g., through a gearbox), the conveyor is more reliable compared to conveyors using belts or chains which are susceptible to failure. The conveyor is also more sanitary as it includes less parts and guarding. In embodiments in which the speed profile (e.g., acceleration and deceleration) of the conveyor is changed by a controller to reverse direction of the flow of material on the pan, the conveyor may be reversed without stopping and/or reversing the drive assembly (e.g., drive motor), allowing the system to be reversed at full speed. This allows for the flow of the product to be reversed instantly and frequently. In embodiments in which the conveyor is driven by a servomotor, the speed profile of the pan may be controlled through the servomotor which reduces the complexity of the conveyor. In some embodiments, the conveyor may include multiple drive assemblies with the servomotor of each drive assembly being connected to a common controller to drive a relatively longer conveyor.

In embodiments in which the counterweight assembly is connected to a counterweight drive frame and a counterweight idler frame, the counterweight top structure may be disposed above at least a portion of the driveline of the drive assembly which allows the counterweight to be close to and in the line of action of the pan. This allows the mass of the counterweight to be reduced and allows the conveyor to operate more efficiently.

In embodiments in which the gearbox is connected to the servomotor shaft and/or the conveyor driveshaft by a keyless lock coupling, slippage and mechanical knocking may be reduced increasing the lifetime of the conveyor drive assembly. Use of an interference fit between the conveyor driveshaft and the gearbox may also reduce premature failure of the drive assembly.

In embodiments in which the cams include hex-shaped through-holes that are interference fit with the driveshaft, slippage and knocking of the drive assembly 19 may be reduced or eliminated.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A horizontal motion conveyor for moving material comprising:
    a pan having a floor for carrying material;
    a plurality of drive assemblies, each drive assembly including a driveshaft that enables the pan to oscillate forward and back causing material to move toward an end of the pan;
    a drive motor connected to the driveshaft for rotating the driveshaft; and
    a controller communicatively connected to each drive assembly to control the rate of rotation of the driveshaft, the controller configured to change the direction that material moves over the pan by changing a speed profile of the pan.

2. The horizontal motion conveyor of claim 1 wherein the controller is configured to rotate the driveshaft according to an acceleration and deceleration curve to move material in a first direction, the controller adjusting the curve about 180 degrees to rotate material in a second direction, the second direction being opposite the first direction.

3. The horizontal motion conveyor as set forth in claim 1 wherein the pan oscillates back and forth over a single rotation of the driveshaft.

4. The horizontal motion conveyor as set forth in claim 1 wherein the drive motor is a rotary servomotor having a servomotor shaft, the controller controlling the rate of rotation of the servomotor shaft.

5. The horizontal motion conveyor as set forth in claim 4 wherein the servomotor is directly connected to the driveshaft by a gearbox.

6. The horizontal motion conveyor as set forth in claim 5 wherein the gearbox is connected to the servomotor shaft by a keyless lock coupling and is connected to the driveshaft by a keyless lock coupling.

7. The horizontal motion conveyor as set forth in claim 1 wherein the controller stores a first set of instructions for forward direction of material and a second set of instructions for reverse direction of material.

8. The horizontal motion conveyor as set forth in claim 7 comprising a forward-reverse control device for selecting a forward direction of material or a reverse direction of material, the controller comprising a processor that executes the first set of instructions upon the forward direction being selected and executes the second set of instructions upon the reverse direction being selected.

9. A horizontal motion conveyor for moving material comprising:
    a pan having a floor for carrying material;
    a driveshaft that enables the pan to oscillate forward and back causing material to move toward an end of the pan;
    a drive motor connected to the driveshaft for rotating the driveshaft, wherein the drive motor is a rotary servomotor having a servomotor shaft, the servomotor being directly connected to the driveshaft by a gearbox, wherein the gearbox is connected to the servomotor shaft by a keyless lock coupling and is connected to the driveshaft by a keyless lock coupling; and
    a controller for controlling the rate of rotation of the driveshaft and the servomotor shaft, the controller configured to change the direction that material moves over the pan by changing a speed profile of the pan.

10. A method for reversing a horizontal motion conveyor having a pan that carries and moves material toward a first end or a second end of the pan, a drive assembly including a drive motor and a cam that moves the pan forward and back, and a driveshaft that rotates to move the pan forward and back, the method comprising:
    loading material on the pan;
    conveying material toward the first end of the pan while oscillating the pan forward and back, the pan accelerating and decelerating as it moves forward and back according to a first speed profile that causes material to move toward the first end of the pan; and
    conveying material toward the second end of the pan while oscillating the pan forward and back, the pan accelerating and decelerating as it moves forward and back according to a second speed profile that causes material to move toward the second end of the pan, wherein the drive motor rotates in the same direction as material is caused to move toward the first end of the pan and as material is caused to move toward the second end of pan, the cam rotates in the same direction as material is caused to move toward the first end of the pan and as material is caused to move toward the second end of pan, and the driveshaft rotates in the same direction as material is caused to move toward the first end of the pan and as material is caused to move toward the second end of pan.

11. The method as set forth in claim 10 wherein the drive motor does not stop or change direction as material is caused to move toward the first end of the pan and as material is caused to move toward the second end of pan.

12. A horizontal motion conveyor for moving material comprising:
    a pan having a floor for carrying material;
    a counterweight assembly having a counterweight top structure disposed below the pan;
    a driveshaft that enables the pan to oscillate forward and back causing material to move toward an end of the pan and that enables the counterweight top structure to oscillate forward and back;
    a first crank arm that moves forward and back upon rotation of the driveshaft;
    a counterweight drive frame connected to the first crank arm and the counterweight top structure, the first crank arm pivoting the counterweight drive frame to move the counterweight top structure;
    a counterweight idler frame, the counterweight idler frame and the counterweight drive frame being pivotally connected to the counterweight top structure;
    a second crank arm that moves forward and back upon rotation of the driveshaft;
    a pan drive frame connected to the second crank arm and the pan, the second crank arm pivoting the pan drive frame to move the pan; and
    a drive motor for rotating the driveshaft.

13. The horizontal motion conveyor as set forth in claim 12 wherein the counterweight top structure is disposed above the driveshaft.

14. A horizontal motion conveyor for moving material comprising:
- a pan having a floor for carrying material;
- a counterweight assembly having a counterweight top structure disposed below the pan;
- a camshaft comprising:
  - a driveshaft that enables the pan to oscillate forward and back causing material to move toward an end of the pan and that enables the counterweight top structure to oscillate forward and back;
  - a first cam that rotates to oscillate the counterweight top structure forward and back; and
  - a second cam that rotates to oscillate the pan forward and back, the first and second cams being offset from each other to move the pan and counterweight top structure in opposite directions as the pan and counterweight top structure oscillate forward and back;
- a first crank arm that moves forward and back upon rotation of the driveshaft;
- a counterweight drive frame connected to the first crank arm and the counterweight top structure, the first crank arm pivoting the counterweight drive frame to move the counterweight top structure;
- a second crank arm that moves forward and back upon rotation of the driveshaft;
- a pan drive frame connected to the second crank arm and the pan, the second crank arm pivoting the pan drive frame to move the pan; and
- a drive motor for rotating the driveshaft.

15. The horizontal motion conveyor as set forth in claim 14 wherein the first cam and second cam each include hex-shaped through-holes which receive a hex-shaped portion of the camshaft.

16. The horizontal motion conveyor as set forth in claim 14 further comprising a counterweight idler frame, the counterweight idler frame and the counterweight drive frame being pivotally connected to the counterweight top structure.

17. The horizontal motion conveyor as set forth in claim 16 wherein the counterweight top structure is disposed above the driveshaft.

18. A horizontal motion conveyor for moving material comprising:
- a pan having a floor for carrying material;
- a counterweight assembly having a counterweight top structure disposed below the pan;
- a driveshaft that enables the pan to oscillate forward and back causing material to move toward an end of the pan and that enables the counterweight top structure to oscillate forward and back;
- a first crank arm that moves forward and back upon rotation of the driveshaft;
- a counterweight drive frame connected to the first crank arm and the counterweight top structure, the first crank arm pivoting the counterweight drive frame to move the counterweight top structure;
- a second crank arm that moves forward and back upon rotation of the driveshaft;
- a pan drive frame connected to the second crank arm and the pan, the second crank arm pivoting the pan drive frame to move the pan; and
- a drive motor for rotating the driveshaft, wherein the drive motor is a rotary servomotor having a servomotor shaft, the servomotor being connected to the driveshaft by a gearbox, the gearbox being connected to the servomotor shaft by a keyless lock coupling and being connected to the driveshaft by a keyless lock coupling.

19. The horizontal motion conveyor as set forth in claim 18 wherein each keyless lock coupling includes clamping collars that draw down on the shaft.

20. The horizontal motion conveyor as set forth in claim 18 further comprising a counterweight idler frame, the counterweight idler frame and the counterweight drive frame being pivotally connected to the counterweight top structure.

* * * * *